United States Patent
Ho et al.

(10) Patent No.: US 10,496,386 B1
(45) Date of Patent: Dec. 3, 2019

(54) APPLICATION DEFINED PACKAGING

(71) Applicant: Futurewei Technologies, Inc., Plano, TX (US)

(72) Inventors: An Ho, San Jose, CA (US); Jun Xu, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/042,805

(22) Filed: Jul. 23, 2018

(51) Int. Cl.
*G06F 8/61* (2018.01)

(52) U.S. Cl.
CPC ..................................... *G06F 8/61* (2013.01)

(58) Field of Classification Search
CPC ........................................................ G06F 8/61
USPC ........................................................ 717/175
See application file for complete search history.

(56) References Cited

U.S. PATENT DOCUMENTS

| | | | | |
|---|---|---|---|---|
| 7,310,664 B1 * | 12/2007 | Merchant | ............ | H04L 41/0886 709/220 |
| 7,721,259 B2 * | 5/2010 | Heinke | ............... | G06F 9/44505 717/121 |
| 7,836,458 B1 * | 11/2010 | Gwozdz | .................. | H04L 29/06 709/221 |
| 2012/0266156 A1 * | 10/2012 | Spivak | .................. | G06F 9/5055 717/172 |
| 2017/0359443 A1 | 12/2017 | Wei et al. | | |
| 2018/0041578 A1 | 2/2018 | Lee et al. | | |

* cited by examiner

*Primary Examiner* — Ryan D. Coyer
(74) *Attorney, Agent, or Firm* — Conley Rose, P.C.

(57) ABSTRACT

A method implemented by an application packaging device, the method comprising obtaining, by a processor of the application packaging device, an application source associated with an application that is executable at an edge computing device, wherein the application source comprises a source code, a manifest, and an archive of resources used by the application, determining, by the processor of the application packaging device, one or more software components from a plurality of software components included in an application generic runtime environment, wherein the one or more software components are used by the application during execution of the application based on the source code and the plurality of software components are used by a plurality of different applications, modifying, by the processor of the application packaging device, the application generic runtime environment based on the one or more software components that are determined to be used by the application during execution to create a custom application runtime environment.

20 Claims, 8 Drawing Sheets

APPLICATION DEFINED PACKAGING

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing is a model for the delivery of hosted services, which may then be made available to users through, for example, the Internet. Cloud computing enables ubiquitous, convenient, on-demand network access to a shared pool of configurable computing resources that can be provisioned and employed with minimal management effort or service provider interaction. By employing cloud computing resources, providers may deploy and manage emulations of particular computer systems through a network, which provide convenient access to the computing resources.

Applications that may be installed at cloud computing environments or hosts are typically packaged into application packages, which include the source code and relevant resources that are used during execution of the application. Certain types of application packages may include a runtime environment associated with an operating system of a particular target device. The runtime environment may be one or more files that include basic software libraries and variables, which may be used by many different applications executing on the target device. However, the runtime environment is typically very large in size. Therefore, transmitting the application package including the runtime environment consumes a large amount of bandwidth, and storing the application package may consume a lot of memory and disc space.

SUMMARY

According to one aspect of the present disclosure, there is provided a method implemented by an application packaging device. The method comprises obtaining, by a processor of the application packaging device, an application source associated with an application that is executable at an edge computing device, wherein the application source comprises a source code, a manifest, and an archive of resources used by the application, determining, by the processor of the application packaging device, one or more software components from a plurality of software components included in an application generic runtime environment, wherein the one or more software components are used by the application during execution of the application based on the source code and the plurality of software components are used by a plurality of different applications, and modifying, by the processor of the application packaging device, the application generic runtime environment based on the one or more software components that are determined to be used by the application during execution to create a custom application runtime environment.

Optionally, in any of the preceding aspects, another implementation of the aspect provides that the edge computing device is deployed between a client and a packet network.

Optionally, in any of the preceding aspects, another implementation of the aspect provides that the one or more software components comprises at least one of a class, object, system variable, environmental variable, software library, package, application programming interface (API), algorithm, or data structure that provide services and support to a plurality of processes that are involved in execution of the application.

Optionally, in any of the preceding aspects, another implementation of the aspect provides that the manifest comprises at least one of a central processing unit (CPU) usage that occurs when executing the application, a memory usage that occurs when executing the application, a disk space required to execute the application, a license association with the application, a company that owns the application, or an author of the application.

Optionally, in any of the preceding aspects, another implementation of the aspect provides that the application generic runtime environment is one or more files comprising at least one of a library, system variables, or environmental variables that provide services and support to a plurality of processes that are involved in execution of a plurality of different applications.

Optionally, in any of the preceding aspects, another implementation of the aspect provides that modifying the application generic runtime environment based on the one or more software components comprises removing, by the processor of the application packaging device, another software component of the plurality of software components that is not used by the application during execution of the application to create the custom application runtime environment, receiving, by the processor of the application packaging device, an external software component that is used by the application during execution of the application and is not included in the application generic runtime environment, and adding, by the processor of the application packaging device, the external software component to the custom application runtime environment.

Optionally, in any of the preceding aspects, another implementation of the aspect provides that the custom application runtime environment only comprises software components that are used by the application during execution of the application.

According to one aspect of the present disclosure, there is provided an apparatus implemented as an application packaging device. The apparatus comprises a memory storage comprising instructions, and one or more processors in communication with the memory storage, wherein the one or more processors execute the instructions to obtain an application source associated with an application that is executable at an edge computing device, wherein the application source comprises a source code, a manifest, and an archive of resources used by the application, determine one or more software components from a plurality of software components included in an application generic runtime environment, wherein the one or more software components are used by the application during execution of the application based on the source code and the plurality of software components are used by a plurality of different applications, and modify the application generic runtime environment based on the one or more software components that are determined to be used by the application during execution to create a custom application runtime environment.

Optionally, in any of the preceding aspects, another implementation of the aspect provides that the one or more processors execute the instructions to modify the manifest to include only information that is relevant to the edge computing device to create a custom application manifest file, and reformat each resource in the archive of resources such that each resource is compatible with the edge computing device and to create a custom application archive of resources.

Optionally, in any of the preceding aspects, another implementation of the aspect provides that the one or more processors execute the instructions to compress the custom application runtime environment, the custom application manifest file, and the custom application archive of resources, and package the custom application runtime environment, the custom application manifest file, and the custom application archive of resources into a custom application package.

Optionally, in any of the preceding aspects, another implementation of the aspect provides that the apparatus further comprises a transmitter coupled to the one or more processors and configured to transmit the custom application package to the edge computing device.

Optionally, in any of the preceding aspects, another implementation of the aspect provides that the apparatus is at least one of an application developer or an application vendor.

Optionally, in any of the preceding aspects, another implementation of the aspect provides that the one or more software components comprises at least one of a class, object, system variable, environmental variable, software library, package, application programming interface (API), algorithm, or data structure that provide services and support to a plurality of processes that are involved in execution of the application.

Optionally, in any of the preceding aspects, another implementation of the aspect provides that the one or more processors are further configured to remove another software component of the plurality of software components that is not used by the application during execution of the application to create the custom application runtime environment, receive an external software component that is used by the application during execution of the application and is not included in the application generic runtime environment, and add the external component to the custom application runtime environment.

According to one aspect of the present disclosure, there is provided a transitory medium configured to store a computer program product comprising computer executable instructions that when executed by a processor cause the processor to obtain an application source associated with an application that is executable at an edge computing device, wherein the application source comprises a source code, a manifest, and an archive of resources used by the application, determine one or more software components from a plurality of software components included in an application generic runtime environment, wherein the one or more software components are used by the application during execution of the application based on the source code and the plurality of software components are used by a plurality of different applications, and modify the application generic runtime environment based on the one or more software components that are determined to be used by the application during execution to create a custom application runtime environment.

Optionally, in any of the preceding aspects, another implementation of the aspect provides that the computer executable instructions that when executed by the processor further cause the processor to modify the manifest to include only information that is relevant to the edge computing device to create a custom application manifest file, and reformat each resource in the archive of resources such that each resource is compatible with the edge computing device and to create a custom application archive of resources.

Optionally, in any of the preceding aspects, another implementation of the aspect provides that the computer executable instructions that when executed by the processor further cause the processor to package the custom application runtime environment, the custom application manifest file, and the custom application archive of resources into a custom application package, and transmit the custom application package to the edge computing device.

Optionally, in any of the preceding aspects, another implementation of the aspect provides that the one or more software components comprises at least one of a class, object, system variable, environmental variable, software library, package, application programming interface (API), algorithm, or data structure that provide services and support to a plurality of processes that are involved in execution of the application.

Optionally, in any of the preceding aspects, another implementation of the aspect provides that the custom application runtime environment only comprises the software components that are used by the application during execution of the application.

Optionally, in any of the preceding aspects, another implementation of the aspect provides that the runtime environment is a file comprising at least one of a library, system variables, or environmental variables that provide services and support to a plurality of processes that are involved in execution of a plurality of different applications.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Applications may be typically packaged to include a source code, a manifest describing some details of the application, and a resource archive including resources that may be used by the application. In some cases, the applications may be packaged into a self-contained application, which includes a runtime environment in addition to the source code, manifest, and archive of resources. The runtime environment may be one or more files that are pre-configured with various software components, such as libraries and variables, to provide support and functionalities to multiple different applications. These self-contained applications are typically very large in size due to the large size of the runtime environment. Embodiments of the present disclosure decrease the size of the runtime environment by filtering out unnecessary components of the runtime environment based on each application to create a custom application runtime environment for each application.

Figure 1:
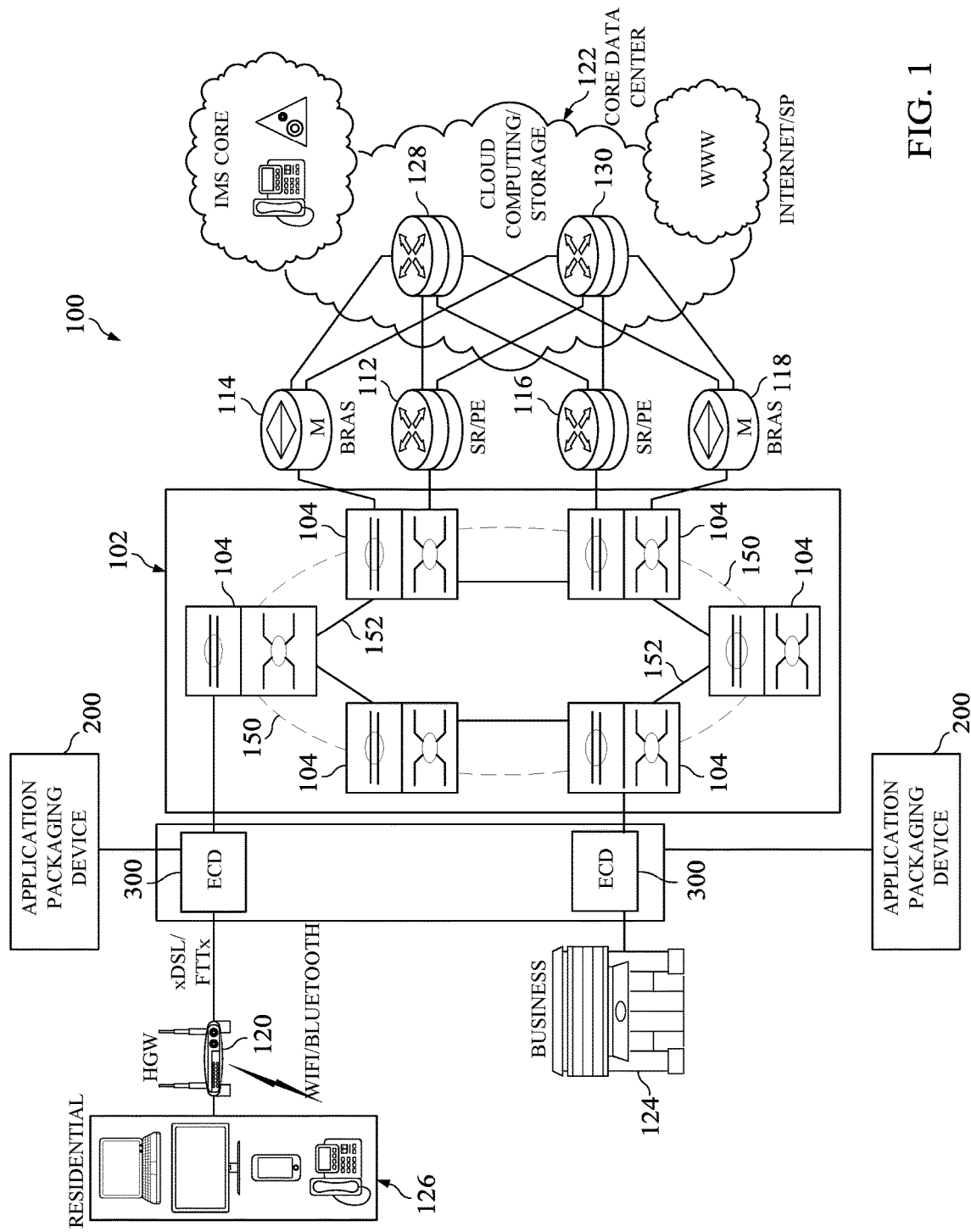
FIG. 1 is a schematic diagram of a system according to various embodiments of the disclosure.

FIG. 1 is a schematic diagram of a system 100 comprising a packet network 102, edge computing devices 300 (labelled as "ECD" in FIG. 1), network elements 112, 114, 116, 118, 120, 128, and 130, service provider 122, clients 124 and 126, and application packaging devices 200. As should be appreciated, system 100 may include other components. System 100 may be configured to package applications at the application package devices 200 and then send the applications to the edge computing devices 300 such that the edge computing devices 300 may install the applications. System 100 may also be configured to provide services from the service provider 122 to the clients 124 and 126. In one embodiment, the edge computing devices 300 may also be configured to provide services to the clients 124 and 126.

Packet network 102 is a network infrastructure that comprises a plurality of integrated packet network nodes 104. Packet network 102 is configured to support transporting both optical data and packet switching data. Packet network 102 is configured to implement the network configurations to configure flow paths or virtual connections between client 124, client 126, edge computing devices 300, and service provider 122 via the integrated packet network nodes 104. The packet network 102 may be a backbone network which connects a cloud computing system of the service provider 122 to the edge computing devices 300 and the clients 124 and 126. The packet network 102 may also connect a cloud computing system of the service provider 122 to other systems such as external Internet, other cloud computing systems, data centers, and any other entity that requires access to the service provider 122.

Integrated packet network nodes 104 are reconfigurable hybrid switches configured for packet switching and optical switching. In an embodiment, integrated packet network nodes 104 comprise a packet switch, an optical data unit (ODU) cross-connect, and a reconfigurable optical add-drop multiplex (ROADM). The integrated packet network nodes 104 are coupled to each other and to other network elements using virtual links 150 and physical links 152. For example, virtual links 150 may be logical paths between integrated packet network nodes 104 and physical links 152 may be optical fibers that form an optical wavelength division multiplexing (WDM) network topology. The integrated packet network nodes 104 may be coupled to each other using any suitable virtual links 150 or physical links 152 as would be appreciated by one of ordinary skill in the art upon viewing this disclosure. The integrated packet network nodes 104 may consider the network elements 112-120 as dummy terminals (DTs) that represent service and/or data traffic origination points and destination points.

Network elements 112-120, 128, and 130 may include, but are not limited to, clients, servers, broadband remote access servers (BRAS), switches, routers, service router/provider edge (SR/PE) routers, digital subscriber line access multiplexer (DSLAM) optical line terminal (OTL), gateways, home gateways (HGWs), service providers, PE network nodes, customers edge (CE) network nodes, an Internet Protocol (IP) router, and an IP multimedia subsystem (IMS) core.

Clients 124 and 126 may be user devices in residential and business environments. For example, client 126 is in a residential environment and is configured to communicate data with the packet network 102 via network elements 112-120 and client 124 is in a business environment and is configured to communicate data with the packet network 102 via network element 110.

Application packaging devices 200 may be one or more devices that are configured to package applications according to the embodiments disclosed herein, which will be further described below with reference to FIG. 4. The application packaging device 200 may be a user device, a server, a data center, a business device, or any other device that is configured to implement the application defined application packaging methods disclosed herein. For example, an application packaging device 200 may be a device of an application developer that develops applications. The application packaging device 200 may also be a device of application vendor that receives the application from an application developer. As will be described below with reference to FIG. 4, the application packaging devices 200 may be configured to create self-contained application packages including a customized runtime environment that is specific to the requirements of an application. In some embodiments, the application packaging devices 200 are configured to transmit the self-contained application package to the edge computing devices 300 such that the edge computing devices 300 may install the application. The physical structure of the application packaging device will be further described below with reference to FIG. 2. In some embodiments, the application packaging device 200 may be implemented using hardware, firmware, and/or software installed to run on hardware.

A service provider 122 may be one or more devices that provide services to the clients 124 and 126 via the edge computing devices 300. The service provider 122 may include, but is not limited to, an Internet service provider, an internet protocol television (IPTV) service provider, an IMS core, a private network, an Internet of Things (IoT) service provider, and a content delivery network (CDN). The service provider 122 may include a cloud computing system. The cloud computing system, cloud computing, or cloud services may refer to a group of servers, storage elements, computers, laptops, cell phones, and/or any other type of network devices connected together by an IP network in order to share network resources stored at one or more data centers of the service provider 122. With a cloud computing solution, computing capabilities or storage resources are provisioned and made available over the packet network 102. Such computing capabilities may be elastically provisioned and released, in some cases automatically, to scale rapidly outward and inward based on demand.

In one embodiment, the service provider 122 may be a core data center that pools computing or storage resources to serve multiple clients 124 and 126 that request services from the service provider 122. For example, the service provider 122 uses a multi-tenant model where fine-grained resources may be dynamically assigned to a client specified implementation and reassigned to other implementations according to consumer demand. In one embodiment, the service provider 122 may automatically control and optimize resource use by leveraging a metering capability at some level of abstraction appropriate to the type of resource (e.g., storage, processing, bandwidth, and active user accounts). A cloud computing solution provides requested resources without requiring clients to establish a computing infrastructure to service the clients 124 and 126. Clients 124 and 126 may provision the resources in a specified implementation by providing various specifications and artifacts defining a requested solution. The service provider 122 receives the specifications and artifacts from clients 124 and 126 regarding a particular cloud-based deployment and provides the specified resources for the particular cloud-based solution via the packet network 102. Clients 124 and 126 have little control or knowledge over the exact location of the provided resources, but may be able to specify location at a higher level of abstraction (e.g., country, state, or data center).

Cloud computing resources may be provided according to one or more various models. Such models include Infrastructure as a Service (IaaS), Platform as a Service (PaaS), and Software as a Service (SaaS). In IaaS, computer infrastructure is delivered as a service. In such a case, the computing equipment is generally owned and operated by the service provider 122. In the PaaS model, software tools and underlying equipment used by developers to develop software solutions may be provided as a service and hosted by the service provider 122. SaaS includes a service provider licensing software as a service on demand. The service provider 122 may host the software, or may deploy the software to a client for a given period of time. The service provider 122 may provide requested cloud-based services to the requesting clients 124 and 126 via either the IaaS, PaaS, or SaaS model.

In an embodiment, an edge computing device 300 is a device that is configured to operate in a manner similar to the service provider 122, except that the edge computing device 300 may be a miniaturized version of a data center that also includes networking input/output functionalities. The edge computing device 300 may be implemented using hardware, firmware, and/or software installed to run on hardware. The edge computing device 300 is coupled to network elements 112, 114, 116, and 118 using any suitable virtual links 150, physical links 152, or optical fiber links. As shown in FIG. 1, the edge computing device 300 is disposed in a location between the clients 124 and 126 and the packet network 102. The edge computing devices 300 may periodically synchronize cloud data from the service provider 122 via the packet network 102. In some embodiments, the edge computing devices 300 store the cloud data locally in a memory or/and a disk so that the edge computing devices 300 may transmit the cloud data to a requesting client without having to access the packet network 102 to receive the data from the service provider 122.

In one embodiment, the edge computing devices 300 may be configured to receive data, such as content, from the service provider 122 via the packet network 102 and store the data in a cache of the edge computing devices 300. A client 126 in a residential environment may transmit a request to the edge computing device 300 for a particular cloud-based deployment associated with the particular cloud-based application that has now been stored in the cache. The edge computing device 300 is configured to search the cache of the edge computing device 300 for the requested cloud-based application and provide the data directly to the client 126. In this way, the client 126 receives the requested content from the edge computing device 300 faster than if the client 126 were to receive the content from the service provider 122 via the packet network 102.

The edge computing device 300 may be similar to the telecommunications edge cloud (TEC) element described in U.S. Patent Pub. No. 2017/0359443, which is hereby incorporated by reference in its entirety. In some embodiments, the edge computing devices 300 may be grouped together based on geographic proximity into a federation such that the edge computing devices 300 in the federation share resources to provide data and services to the clients 124 and 126. The federation is further described in U.S. Patent Pub. No. 2015/0041578, filed on Aug. 8, 2016, which is hereby incorporated by reference in its entirety.

In some embodiments, the edge computing devices 300 may install and execute applications that are configured to facilitate the maintenance and functioning of the edge computing devices 300. For example, these applications may be applications for processing data, microservice applications, lambda applications, data analytics application, virtual private network (VPN) services, value added services (VAS), IPTV services, CDN services, IoT services, and Internet Protocol Multimedia services. As should be appreciated, the edge computing devices 300 may install and execute many other types of applications.

Typically, the application packaging device 200 packages an application and then sends the application package to the edge computing device 300 such that the edge computing device 300 may install the application using the application package. Application packaging refers to the creation of an executable file that contains the files, registry, and logic that is used to install the application onto a target device, such as the edge computing device 300, in a manner such that the application is compatible with the operating system executing on the target device. For example, an application package may typically comprise a source code, a manifest file, and an archive of resources used by the application that are each compatible with the target device, which, in this case, is the edge computing device 300.

The edge computing device 300 typically uses a runtime environment to perform the various processes and functions during execution of the application received in the application package. A runtime environment refers to one or more executable files (also referred to herein as "the runtime file") that provide the basic functions that an application may use to properly run on a target device, such as the edge computing device 300, executing a particular operating system. For example, the application may use the runtime environment to send instructions or command a system processor or other system resources, such as random access memory (RAM), of the edge computing device 300 to perform certain processes of the application. In this way, the runtime file provides access to resources such as software libraries, packages, Application Programming Interfaces (APIs), system variables, and/or environmental variables that provide services and support to processes involved in the execution of an application.

A runtime environment is typically generated separate from the various different applications that use the runtime environment so that multiple different applications may use the same runtime environment. For example, various different applications that execute using JAVA may also use the JAVA SE runtime environment or the OPEN JDK runtime environment. In an embodiment, an application that executes using a JAVASCRIPT application code may use a NODE JS runtime environment for a particular operating system executing at the edge computing device 300. As another illustrative example, various different applications that use PYTHON application code may also use the PYTHON runtime environment for the particular operating system executing at the edge computing device 300. As should be appreciated, the embodiments disclosed herein apply to applications that use any runtime environment and is not limited in this regard.

There are typically two ways that the edge computing device 300 may receive the runtime file for a runtime environment used by one or more applications executing on the edge computing device 300. First, the runtime file is created and pre-configured such that the runtime file is downloaded onto edge computing devices 300 before any applications that may use the runtime file are downloaded. The other method for ensuring that the runtime environment is present on the target device (e.g., edge computing device 300) is for the application packaging device 200 to create a self-contained application package, which comprises not only the application package with the application source code, but also comprises the runtime file used to execute the application. This self-contained application package may be sent to the edge computing device 300 so that the edge computing device 300 may use the runtime file in the self-contained application package to execute the application.

In both of these scenarios, the edge computing device 300 may receive the entire the runtime environment either before receiving the application or while receiving the application. A runtime environment is typically large in size because the runtime file includes various classes and objects that may be required for numerous different applications. For example, most runtime environments are at least about 100 megabytes (MB), and frequently even larger than 100 MB. However, most edge computing devices 300 have limited resources (e.g., memory and disc space) available to download and the install the entire runtime environment locally to the edge computing device 300. In addition, in both of these scenarios, multiple applications share a single runtime environment, and therefore, the edge computing device 300 may not be able to isolate the execution of the various different applications using the same runtime environment.

Disclosed herein are embodiments directed to application defined application packaging in which a runtime environment is filtered to only include the software components that are relevant to a particular application. For example, an application packaging device 200 obtains an application source, where the application source may include a source code, a manifest, and archive of resources used by the application. In some cases, obtaining the application source may refer to receiving the application source from an application developer or retrieving the application source from a local memory of an application vendor. In an embodiment, the application packaging device 200 may determine which components of the runtime environment are necessary during execution of the application corresponding to the application source. The application packaging device 200 may filter out the components of the runtime environment that are not necessary during execution of the application to create a custom application runtime environment. The application packaging device 200 may also perform a similar filtering mechanism on the manifest and the archive of resources to create a custom application manifest and custom application archive of resources. In some embodiments, the application packaging device 200 is configured to package the custom application runtime environment, custom application manifest file, and the custom application archive of resources to create a custom application package. The application package device 200 is configured to send the custom application package archive to the edge computing device 300 such that the edge computing device 300 may download the application based on the custom application package archive.

The embodiments of the present disclosure provide many advantages over previously used methods of application packaging. For example, filtering out the unnecessary components of the runtime environment results in a custom runtime environment that is drastically smaller in size than traditional pre-configured runtime environments. The smaller custom runtime environment consumes less bandwidth when being transmitted from the application packaging device 200 to the edge computing device 300. The smaller custom runtime environment also enables the edge computing device 300 to save bandwidth when downloading the application package, save disc space when installing the custom application package, and utilize less memory when executing the custom application package.

Figure 2:
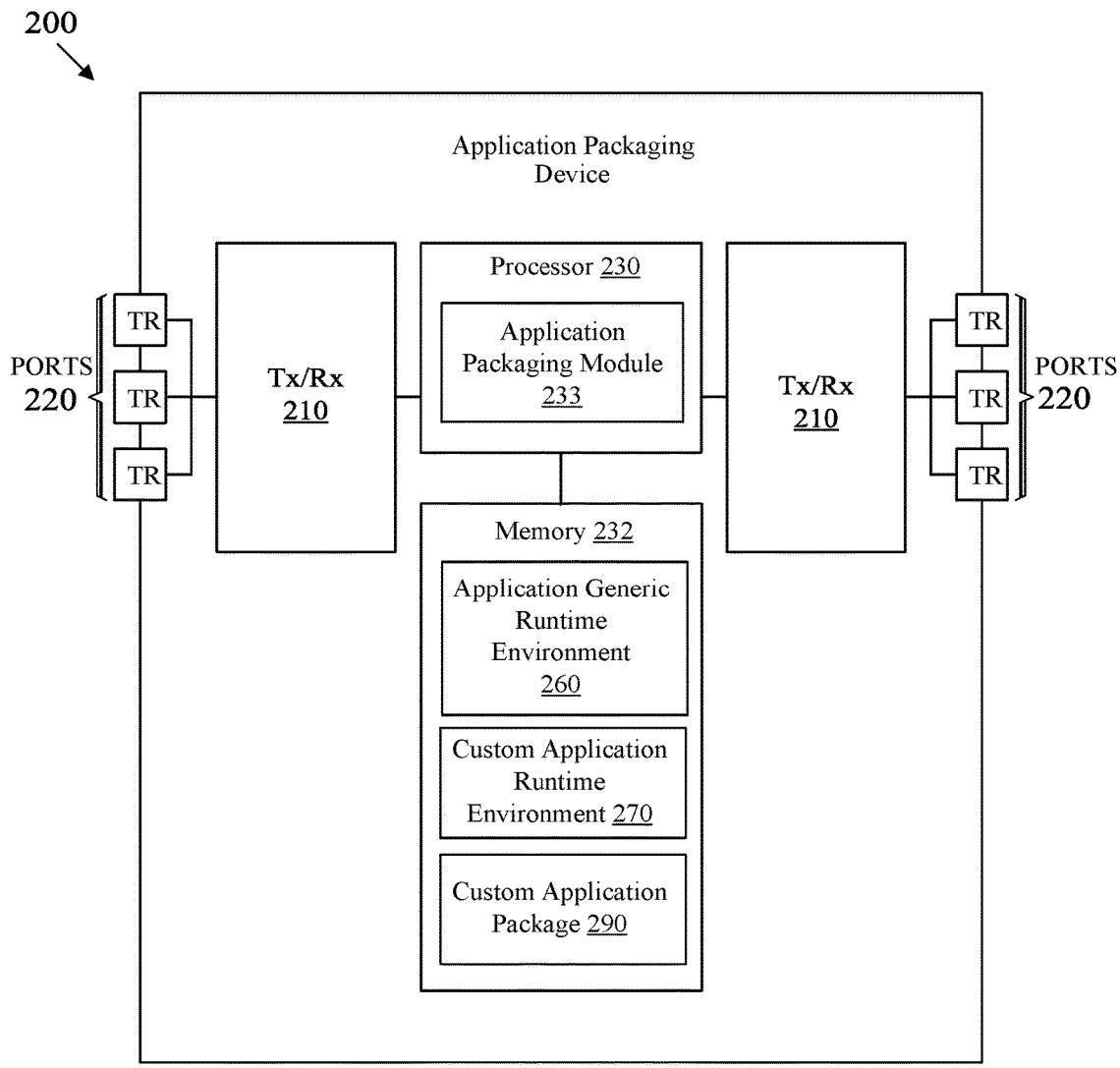
FIG. 2 is a schematic diagram of an application packaging device suitable for creating application defined application packages according to the various embodiments disclosed herein.

FIG. 2 is a schematic diagram of an application packaging device 200 suitable for creating application defined application packages as disclosed herein. In an embodiment, the application packaging device 200 is configured to filter a runtime environment to exclude the software components that are not necessary when executing an application and package the runtime environment with a filtered source code, a filtered manifest, and a formatted archive of resources used by the application to create a custom application package, as described herein. In an embodiment, the application packaging device 200 is a switch, router, gateway, virtual machine (VM), or other device used in the packaging of applications and transportation of application packages across a network.

The application packaging device 200 comprises ports 220, transceiver units (Tx/Rx) 210, a processor 230, and a memory 232. The processor 230 comprises an application packaging module 233. Ports 220 are coupled to Tx/Rx 210, which may be transmitters, receivers, or combinations thereof. The Tx/Rx 210 may transmit and receive data via the ports 220. Processor 230 is configured to process data. Memory 232 is configured to store data and instructions for implementing embodiments described herein. The application packaging device 200 may also comprise electrical-to-optical (EO) components and optical-to-electrical (OE) components coupled to the ports 220 and Tx/Rx 210 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 232. The application packaging module 233 is implemented by processor 230 to execute the instructions for implementing various embodiments discussed herein. For example, the application packaging module 233 is configured to create the application defined application package according to method 800. For example, the application packaging module 233 is configured to filter the pre-configured runtime environments to create a customized runtime environment for a particular application. The inclusion of the application packaging module 233 provides an improvement to the functionality of application packaging device 200. The application packaging module 233 also effects a transformation of application packaging device 200 to a different state. Alternatively, the application packaging module 233 is implemented as instructions stored in the memory 232.

The memory 232 comprises one or more of disks, tape drives, or solid-state drives and may be used as an over-flow data storage device, to store programs when such programs are selected for execution, and to store instructions and data that are read during program execution. The memory 232 may be volatile and non-volatile and may be read-only memory (ROM), random-access memory (RAM), ternary content-addressable memory (TCAM), and static random-access memory (SRAM). The memory 232 may store application generic runtime environments 260, which may be one or more pre-configured runtime environments that are created for numerous different applications to be executed properly on a target device. For example, the application generic runtime environments 260 may comprise one or more executable files that provide the basic functions that may be used by many different applications such that the applications may properly execute on a target device having a given operating system. An application generic runtime environment 260 may be a JAVA runtime environment, a JAVA development kit, a PYTHON runtime environment, a NODEJS runtime environment, or any other generic runtime environment available to download that is not customized to any particular application. The memory 232 may also store the custom application runtime environments 270 that are each created for specific applications by filtering out the unnecessary components from an application source that is received from an application developer or application vender. For example, the custom application runtime environments 270 may include one or more executable files that include the software components that may be used by a particular application during execution. The memory 232 may also store the custom application package 290 that is created for specific applications, and the custom application package 290 may include the custom application runtime environment 270, a custom application manifest, and a custom archive resource that are used by and compatible with the edge computing device 300, as will be further described below with reference to FIGS. 4-7.

It is understood that by programming and/or loading executable instructions onto the application packaging device 200, at least one of the processor 230 and/or memory 232 are changed, transforming the application packaging device 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
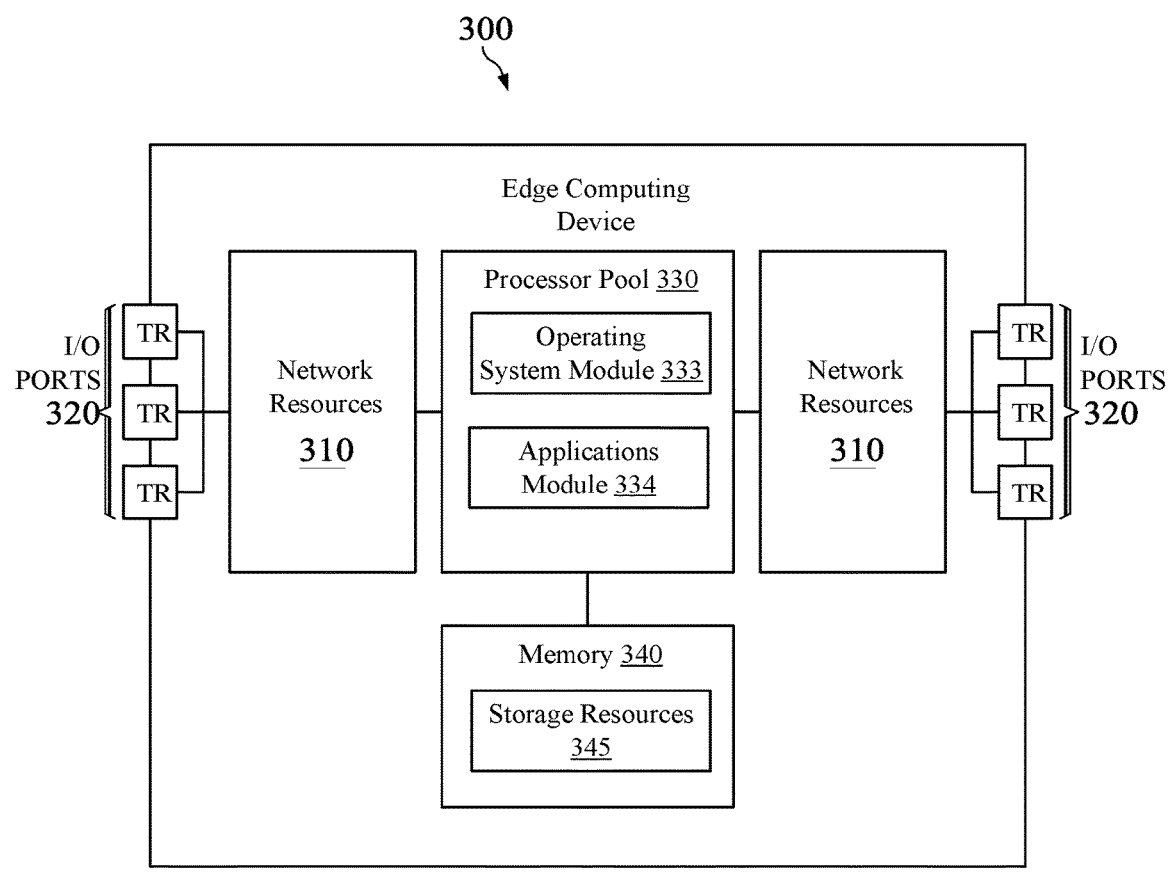
FIG. 3 is a schematic diagram of an embodiment of an edge computing device according to various embodiments of the disclosure.

FIG. 3 is a schematic diagram of an embodiment of an edge computing device 300 according to various embodiments of the disclosure. The edge computing device 300 may be similar to the TEC element described in U.S. Patent Pub. No. 2017/0359443, which is already incorporated by reference in its entirety. The edge computing device 300 is a modular telecom device which integrates networking resources, computing resources, storage resources, operation system, and various cloud applications into one compact box or chassis. The edge computing device 300 may be a modified network element, a modified network node, or any other logically/physically centralized networking computing and storage device that are configured to store and execute applications that are received as custom application packages from the application packaging device 200. The edge computing device 300 may be configured to implement and/or support the telecom edge cloud system mechanisms and schemes described herein. The edge computing device 300 may be implemented in a single box/chassis or the functionality of the edge computing device 300 may be implemented in a plurality of interconnected boxes/chassis. The edge computing device 300 may be any device including a combination of devices (e.g., a modem, a switch, router, bridge, server, client, controller, memory, disks, cache, etc.) that stores cloud computing resources, receives custom application packages from an application packaging device 200, and installs the application using the custom application packages.

At least some of the features/methods described in the disclosure are implemented in a networking/computing/storage apparatus such as the edge computing device 300. For instance, the features/methods in the disclosure may be implemented using hardware, firmware, and/or software installed to run on hardware. The edge computing device 300 is any device that has cloud computing, storage resources, e.g., a memory and a CPU, and networking resources that transports packets through a network, e.g., a switch, router, bridge, server, a client, etc. As shown in FIG. 3, the edge computing device 300 comprises network resources 310, which may be transmitters, receivers, switches, routers, switching fabric or combinations thereof. In some embodiments, the network resources 310 may comprise a PE router, an optical line terminal (OLT), a broadband network gateway (BNG), wireless access point equipment, and/or an optical transport network (OTN) switch. The network resources 310 are coupled to a plurality of input/output (I/O) ports 320 for transmitting and/or receiving packets or frames from other nodes.

A processor pool 330 is a logical CPU in the edge computing device 300 that is coupled to the network resources 310 and executes applications using the custom application package 290 received from the application packaging device 200. The processor pool 330 may comprise one or more multi-core processors and/or memory devices 340, which may function as data stores, buffers, etc. In one embodiment, the processor pool 330 may be implemented as generic servers, VMs, containers or may be part of one or more ASICs and/or DSPs.

The processor pool 330 comprises an operating system module 333, which may control and manage the networking, computing, and storage functions of the edge computing device 300. The processor pool 300 also comprises an applications module 334, which may download and install the applications from the application packaging device 200. As such, the inclusion of the operating system module 333 and the applications module 334 and associated methods and systems provide improvements to the functionality of the edge computing device 300. Further, the operating system module 333 and the applications module 334 may effect a transformation of a particular article (e.g., the network) to a different state. In an alternative embodiment, the operating system module 333 and the applications module 334 may be implemented as instructions stored in the memory device 340, which may be executed by the processor pool 330.

The memory device 340 may comprise storage resources 345, and a cache for temporarily storing content, e.g., a RAM. Additionally, the memory device 340 may comprise a long-term storage for storing content relatively longer, for example, a ROM. For instance, the cache and the long-term storage may include dynamic RAMs (DRAMs), solid-state drives (SSDs), hard disks, or combinations thereof.

Figure 4:
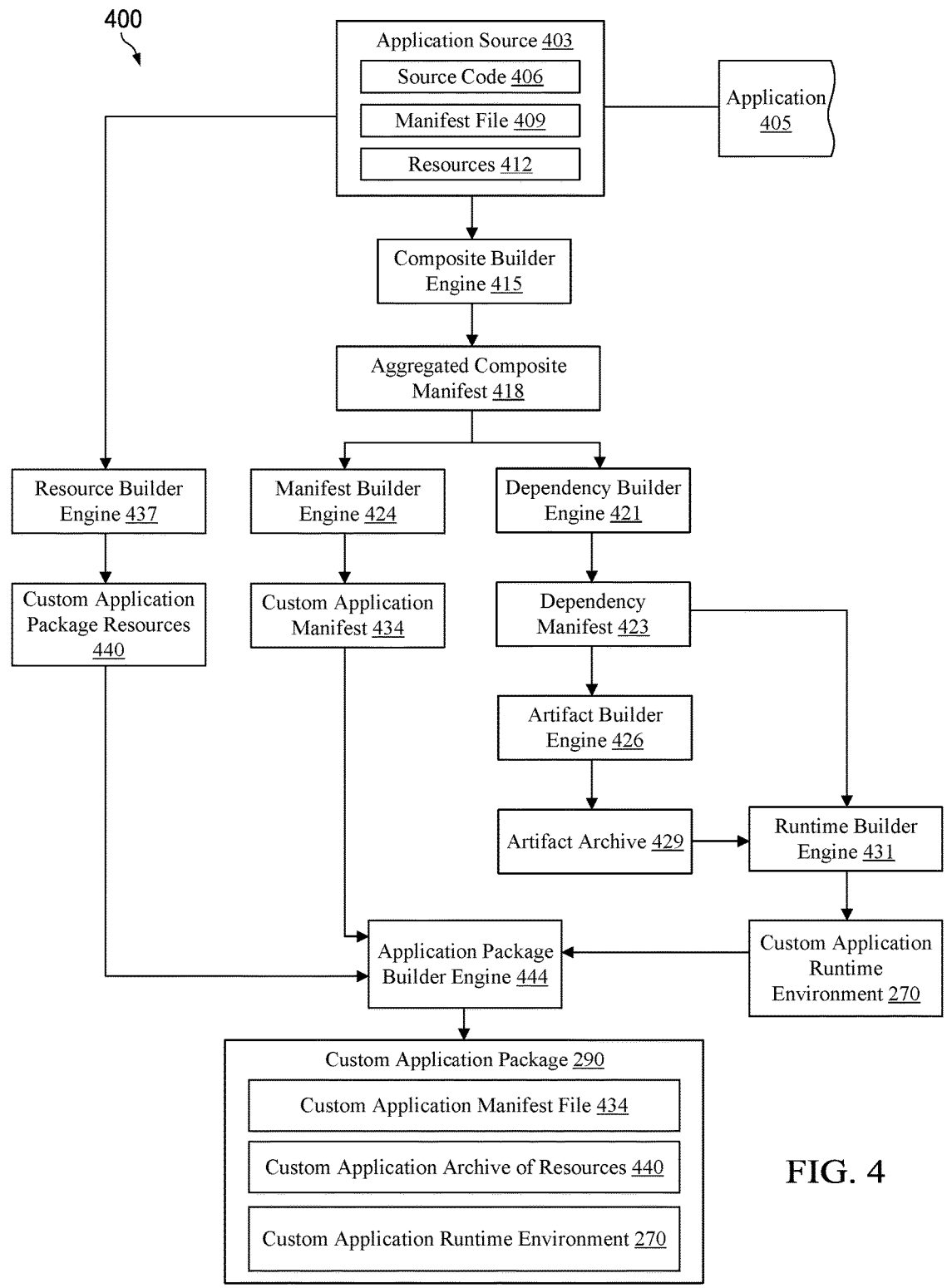
FIG. 4 is a diagram illustrating an example of a process of generating a custom application package for a particular application according to various embodiments of the disclosure.

FIG. 4 is a diagram illustrating an example of process 400 of generating a custom application package 290 for a particular application 405 according to various embodiments of the disclosure. In an embodiment, the process 400 may be performed by the application packaging module 233, which is executed by the processor 230 of the application packaging device 200. While the example process 400 shows the process of generating a custom application package 290 that is to be transmitted to and installed by the edge computing device 300, it should be appreciated that the example process 400 may be used to generate a custom application package 290 for an application 405 destined for any type of target device.

First, the application packaging device 200 may obtain an application source 403. For example, obtaining the application source 403 may refer to receiving the application source 403 created by an application developer. Obtaining the application source 403 may also refer to creating the application source 403. In an embodiment, the application source 403 may be one or more files or data that an application developer creates for a particular application 405. The application source 403 may include a source code 406, a manifest 409, and resource 412 that are related to the installation and execution of the application 405. For example, the source code 406 may be a collection of computer instructions and/or comments written using a human-readable programming language, which is often transformed by an assembler or compiler into binary machine code that is understood by the target device, which may be the edge computing device 300.

The manifest 409 may be a file, such as an Extensible Markup Language (XML) file, that describes and identifies the shared and private data that an application should bind to at run time to a target environment. The manifest 409 may include information that is relevant to the installation and execution of the application 405. For example, the relevant information in the manifest 409 may include a CPU usage amount or percentage that indicates how much processing power may be required to execute the application 405. The relevant information in the manifest 409 may also include a memory usage amount or percentage that indicates how much memory is needed during the execution of the application 405. The relevant information in the manifest 409 may also include a disc space usage amount or percentage that indicates how much space is needed during execution of the application 405. In some cases, the manifest 409 may include irrelevant information that is not needed during execution of the application 405. For example, the manifest 409 may include a license of the application 405, an author of the application 405, comments associated with the application 405, an owner of the application 405, and/or any other type of information that is not relevant to the installation or execution of the application 405 at the edge computing device 300.

The resources 412 may include application class files, metadata, text, images, video content, and/or any other data that the application 405 may use during execution of the application 405 at any target device. The resources 412 have not been reformatted such that the resources 412 are compatible with any particular target device, such as the edge computing device 300.

After obtaining the application source 403, the application packaging device 200 may execute the composite builder engine 415 to scan the application source 403 and generate an aggregated composite manifest 418 of the requirements and context of the application 405. In an embodiment, the composite builder engine 415 may be software instructions that are stored in the memory 232 and may be executed by the application packaging module 233 of the processor 230. For example, the composite builder engine 415 first scans the application source 403 to identify software components that the application 405 may use during execution. The software components that may be identified during the scanning of the application source 403 may include software libraries, classes, packages, APIs, objects, variables, data structures, algorithms, properties files, data files, meta files, debug information files, and/or other software resources that the application 405 may use during execution. The aggregated composite manifest 418 of the requirements and context of the application 405 may include each of the software components identified by the composite builder engine 415.

After generating the aggregated composite manifest 418 of the requirements and context of the application 405, the application packaging device 200 may execute a dependency builder engine 421. The dependency builder engine 421 may be software instructions that are stored in the memory 232 and may be executed by the application packaging module 233 of the processor 230. For example, the dependency builder engine 421 generates a dependency manifest 423, which may include a list of software libraries that the application 405 may use during execution of the application 405. Execution of the application refers to a run time of the application, not compile time, load time, or build time of the application. In an embodiment, the dependency builder engine 421 may examine the aggregated composite manifest 418 to identify one or more software libraries that correspond to the software components in the aggregated composite manifest 418. The dependency manifest 423 may include the software libraries identified by the dependency builder engine 421 that correspond to the software components in the aggregated composite manifest 418. In an embodiment, the dependency manifest 421 may be a dependency graph that shows how the various classes used by the application 405 during execution corresponding to particular software libraries. In some embodiments, the software libraries identified by the dependency builder engine 421 may correspond to .JAR files.

As an illustrative example, suppose that the composite builder engine 415 identified that the application 405 uses the DEEPLEARNING4J Support Vector Machine class during execution of the application 405. In this case, the aggregated composite manifest 418 includes the DEEPLEARNING4J Support Vector Machine class. In this case, the dependency builder engine 421 may determine that the software library DEEPLEARNING4J corresponds to the DEEPLEARNING4J Support Vector Machine class. Therefore, in this example, the dependency manifest 423 may include the DEEPLEARNING4J library.

After the dependency manifest 423 is created, the application packaging device 200 may execute the artifact builder engine 426. The artifact builder engine 426 may be software instructions that are stored in the memory 232 and may be executed by the application packaging module 233 of the processor 230. For example, the artifact builder engine 426 may import artifacts of modular libraries that may be used by the application 405 during execution from external servers or external service providers, and these modular libraries are not already included in the application generic runtime environment 260. In an embodiment, the artifact builder engine 426 may compare the libraries or artifacts of libraries included in the dependency manifest 423 to the application generic runtime environment 260 to determine which additional libraries should be downloaded and packaged with the application 405 for proper execution. As discussed above, the application generic runtime environment 260 includes all the basic software components, such as libraries, classes, files, objects, variables, etc., that may be used by numerous different applications. However, the application generic runtime environment 260 frequently does not include some of the libraries used by an application 405. In this scenario, the artifact builder engine 426 receives the libraries (e.g., an external software component) used by the application 405 that are not already included in the application generic runtime environment 260 from an external source, such as an external server or an external service provider. In an embodiment, the libraries (e.g., external software components) received by the artifact builder engine 426 are aggregated into the artifact archive 429 such that the artifact archive 429 includes the libraries or artifacts (e.g., external software components) from libraries that are used by the application 405 during execution but not included in the application generic runtime environment 260.

After the artifact archive 429 is created, the application packaging device 200 may execute the runtime builder engine 431. The runtime builder engine 431 may be software instructions that are stored in the memory 232 and may be executed by the application packaging module 233 of the processor 230. The runtime builder engine 431 may be configured to filter the application generic runtime environment 260 to exclude software components that are not used by the application 405 during execution. For example, some of the software components identified in the aggregate composite manifest 418 are not provided by the libraries downloaded into the artifact archive 429. Instead, these software components that are used by the application 405 are provided by the application generic runtime environment 260. However, the application generic runtime environment 260 still includes numerous other components that are not relevant or necessary for the proper execution of the application 405. In an embodiment, the runtime builder engine 431 is configured to remove the components that are not relevant or necessary for the proper execution of the application 405 from the application generic runtime environment 260 to create the custom application runtime environment 270. For example, the runtime builder engine 431 may be configured to examine the original source code of the runtime environment and filter out all the unnecessary software components such that the runtime environment only includes software components that are used by the application at runtime. For example, the runtime builder engine 431 may remove class files that are not used by the application, image files, XML files, or any other files included in the application generic runtime environment 260 to create the custom application runtime environment 270.

In some embodiments, the custom application runtime environment 270 may be reconfigured to accommodate the changes made to the application generic runtime environment 260 to ensure that the custom application runtime environment 270 builds successfully. The runtime builder engine 431 may also reconfigure the application generic runtime environment 260 to be the custom application runtime environment 270 such that when the relevant build script is executed on the custom application runtime environment 270, the custom application runtime environment 270 will properly compile and run.

After generating the aggregated composite manifest 418 of the requirements and context of the application 405, the application packaging device 200 may execute a manifest builder engine 424. The manifest builder engine 424 may be software instructions that are stored in the memory 232 and may be executed by the application packaging module 233 of the processor 230. For example, the manifest builder engine 424 generates a custom application manifest 434 based on the manifest 409. In an embodiment, the manifest builder engine 424 may remove the information from the manifest 409 that is irrelevant to the edge computing device 300 or any other target device that executes application 409 to create the custom application manifest 434. For example, the manifest builder engine 424 may remove the irrelevant information that is not needed during execution of the application 405, such as, for example, a license of the application 405, an author of the application 405, comments associated with the application 405, an owner of the application 405, etc., to create a condensed and custom application manifest file 434.

After obtaining the application source 403, the application packaging device 200 may execute the resource builder engine 437. The resource builder engine 437 may be software instructions that are stored in the memory 232 and may be executed by the application packaging module 233 of the processor 230. In an embodiment, the resource builder engine 437 may create the custom application archive of resources 440 based on resources 412. For example, the resource builder engine 437 may transform all the data and files included in resources 412 into data and files that are compatible with the edge computing device 300 or any other target device that executes application 405.

After the application packaging device 200 creates the custom application runtime environment 270, the custom application manifest 434, and the custom application archive of resources 440, the application packaging device 200 may execute the application package builder engine 444. The application package builder engine 444 may be software instructions that are stored in the memory 232 and may be executed by the application packaging module 233 of the processor 230. For example, the application package builder engine 444 may be configured to create the custom application package 290, which is a customized application package for the application 405. The custom application package 290 includes the custom application runtime environment 270, the custom application manifest 434, and the custom application archive of resources 440. In an embodiment, the application package builder engine 444 compresses the custom application runtime environment 270, the custom application manifest 434, and the custom application archive resources 440 to create a condensed custom application package 290.

In some embodiments, the transmission of the custom application package 290 transmitted to the edge computing device 300 and any other target device consumes far less bandwidth than previous methods of transmitting application packages because the custom application package 290 is much smaller than traditional self-contained application packages. This is due to the fact that the custom application package 290 contains a custom application runtime environment 270, which is much smaller in size than the application generic runtime environment 26 that is included in traditional self-contained application packages. The target device, such as the edge computing device 300, that downloads and installs the custom application package 290 uses less memory and disc space than devices that download and install traditional self-contained applications. Again, this is due to the fact that the custom application package 290 is drastically smaller in size that the traditional self-contained applications.

Figure 5:
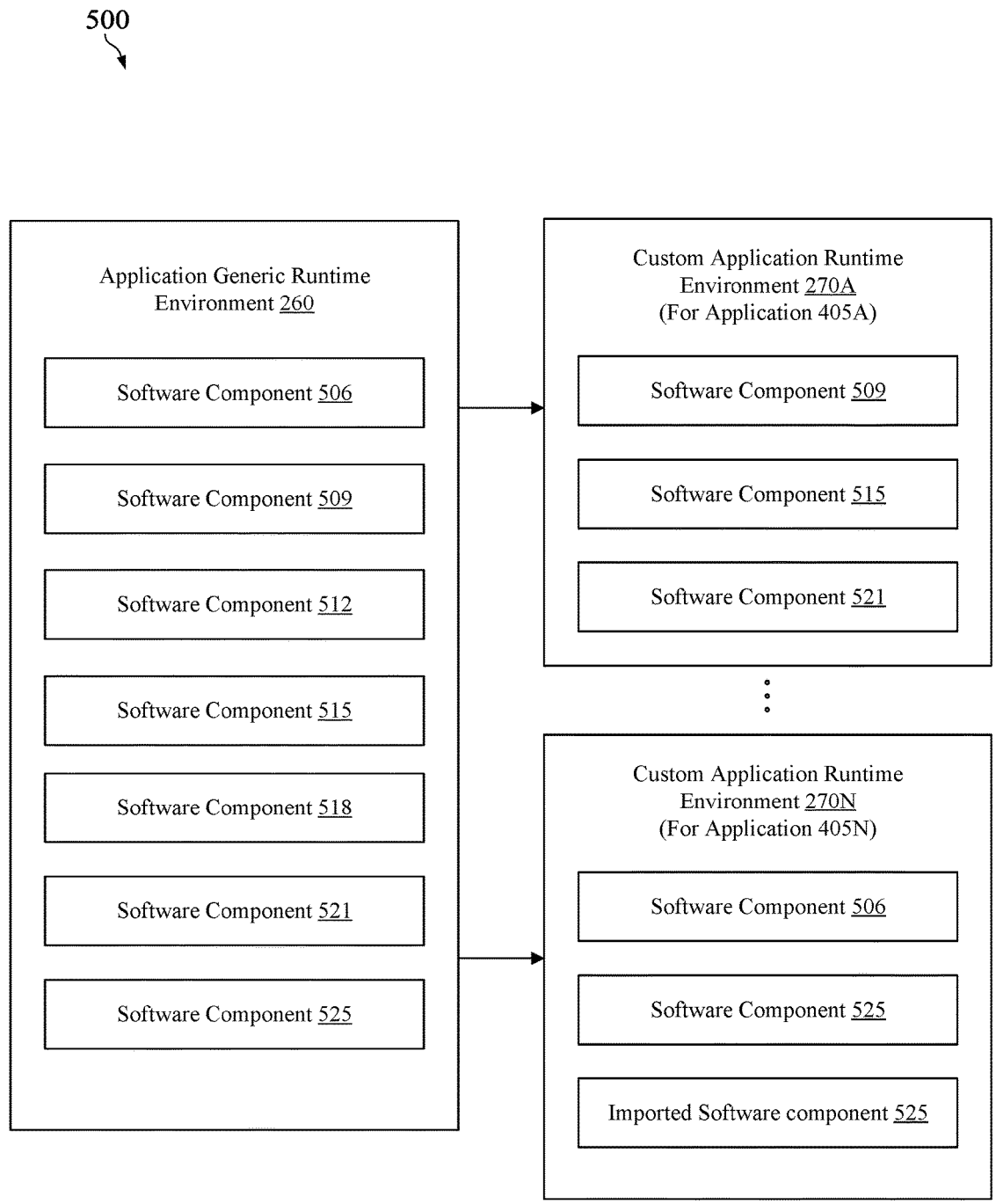
FIG. 5 is a diagram illustrating a process of creating one or more custom application runtime environments for different applications according to various embodiments of the disclosure.

FIG. 5 is a diagram illustrating a process 500 of creating one or more custom application runtime environments 270A-N for different applications 450A-N according to various embodiments of the disclosure. In an embodiment, the process 500 may be performed by the application packaging module 255, which is executed by the processor 205 of the application packaging device 200. For example, process 500 may be performed by the runtime builder engine 431. While the example process 500 shows the process of generating two custom application runtime environments 270A and 270N, it should be appreciated that the example process 500 may be used to generate any number of custom application runtime environments 270A-N for any number of different applications 450A-N.

A shown in FIG. 5, the application generic runtime environment 260 comprises various different software components 506, 509, 512, 515, 518, 521, and 525. As described above, the application generic runtime environment 260 may be a pre-configured file comprising multiple different software components that applications may use when executing in a particular operating system. Some of the core classes that may be included in the application generic runtime environment 260 may include a set of dynamically loadable libraries that the application can call at run time, or during execution of the application (not compile time, link time, or load time). These standard libraries may include definitions of commonly used algorithms, data structures, and mechanisms for input and output. For example, a standard library may include subroutines, macro definitions, global variables, class definitions, and templates depending on the constructs made available by a host language. In this way, the software components 506, 509, 512, 515, 518, 521, and 525 may refer to a software class, an object, a system variable, an environmental variable, software library, an algorithm, a data structure, a mechanism for input/output, a subroutine, a macro definition, a global variable, a class definition, a template, a base library, a base package, properties files, data files, meta files, debug information files, or any other software functions that provide necessary services and support to the processes involved in the execution of the application or program.

An example of the application generic runtime environment 260 may be a JAVA runtime environment (JRE), which is a software environment (one or more files) in which programs compiled for a typical JAVA Virtual Machine (JVM) implementation may run. The JRE may include the code necessary to run JAVA applications, dynamically link native methods, manage memory, and handle exceptions. The JRE also includes an implementation of the JVM and supporting files that are used for the implementation of the JVM. Another example of the application generic runtime environment 260 for JAVA may be the JAVA Development Kit (JDK), which is a superset of the JRE and contains everything in JRE, plus tools such as compilers and debuggers necessary for developing applets and applications.

Examples of some of the base libraries included in the JDK and the JRE may be a Math library, a Monitoring and Management library, a Package Version Identification Library, a Reflection library, a Reference Objects library, a Collections Framework library, a Concurrency Utilities package, a Java Archive (JAR) Files library, a Logging library, and a Preferences Application Programming Interface (API). Other base packages included in the JDK and the JRE may be an I/O package, an Object Serialization packages, a Networking package, a Security API, an Internalization package, a JAVABEANS Component API, a Java Management Extensions (JMX) API, an XML platform, a JAVA Native Interface (JNI), an Extension Mechanism package, and an Endorsed Standards Override Mechanism. Other integration libraries included in the JDK and the JRE may be the JAVA Database Connectivity (JDBC) API and the Remote Method Invocation (RMI) library. As should be appreciated, the JDK and JRE may also include other base libraries, base packages, and integration libraries that are not otherwise mentioned herein. Each of the base libraries, base packages, and integration libraries listed above may be considered one or more of the software components 506, 509, 512, 515, 518, 521, and 525, as referred to herein.

In this way, other types of application generic runtime environments 260, all of which are not listed herein, may include many different software components 506, 509, 512, 515, 518, 521, and 525. However, the application generic runtime environment 260 contains many software components 506, 509, 512, 515, 518, 521, and 525 that are not necessary by the application at run time. For example, suppose that the application generic runtime environment 260 corresponds to the JDK. In this example, suppose that the software component 506 is I/O package, the software component 509 is the Math library, the software component 512 is the Reflection library, software component 515 corresponds to the Reference Objects library, software component 518 is the Internalization package, software component 521 is the Security package, and software component 525 is the Concurrency Utilities package.

In this example, suppose that the application packaging device 200 obtains two different applications 405A and 405N that are to be packaged to include a custom application runtime environment 270A and 270N, respectively, based on the JDK (application generic runtime environment 260). For example, suppose that application 405A does not use the I/O package (software component 506), the Reflection library (software component 512), the Internalization package (software component 518), or the Concurrency Utilities package (software component 525). In this way, the runtime builder engine 431 may be configured to filter out, or remove, the I/O package (software component 506), the Reflection library (software component 512), the Internalization package (software component 518), or the Concurrency Utilities package (software component 525) from the application generic runtime environment 260 to create the custom application runtime environment 270A. In this way, the custom application runtime environment 270A only includes the software components corresponding to software components actually used by application 405A at run time. As shown in FIG. 5, the custom application runtime environment 270A includes the Math library (software component 509), the Reference Objects library (software component 515), and the Security package (software component 521). In an embodiment, the processor 230 may execute the application packaging module 233 or the runtime builder engine 431 to generate the custom application runtime environment 270A.

In this example, suppose that application 405B does not use the Math library (software component 509), the Reflection library (software component 512), the Reference Objects library (software component 515), the Internalization package (software component 518), and the Security package (software component 521) from the application generic runtime environment 260 to create the custom application runtime environment 270B. In this way, the runtime builder engine 431 may be configured to filter out, or remove, the Math library (software component 509), the Reflection library (software component 512), the Reference Objects library (software component 515), the Internalization package (software component 518), and the Security package (software component 521) from the application generic runtime environment 260 to create the custom application runtime environment 270B. In this way, the custom application runtime environment 270B only includes the software components corresponding to resources actually used by application 405B at run time. As shown in FIG. 5, the custom application runtime environment 270B includes the I/O package (software component 506) and the Concurrency Utilities package (software component 525).

In some embodiments, the application 405B may use a software component that is not included in the application generic runtime environment 260. For example, suppose that the dependency manifest 423 created for the application 405B by the dependency builder engine 421 indicates that application 405B uses the DEEPLEARNING4J library, which is not part of the application generic runtime environment 260. In this case, the artifact builder engine 426 may download the DEEPLEARNING4J library and add the DEEPLEARNING4J library to the artifact archive 429. The runtime builder engine 431 may retrieve this downloaded DEEPLEARNING4J library and add the DEEPLEARNING4J library to the custom application runtime environment 270 as the imported software component 525. In this way, the custom application runtime environments 270A and 270B may include not only the software components from the application generic runtime environment 260, but also externally downloaded software components. In an embodiment, the processor 230 may execute the application packaging module 233, the artifact builder engine 426, and/or the runtime builder engine 431 to generate the custom application runtime environment 270B.

Figure 6:
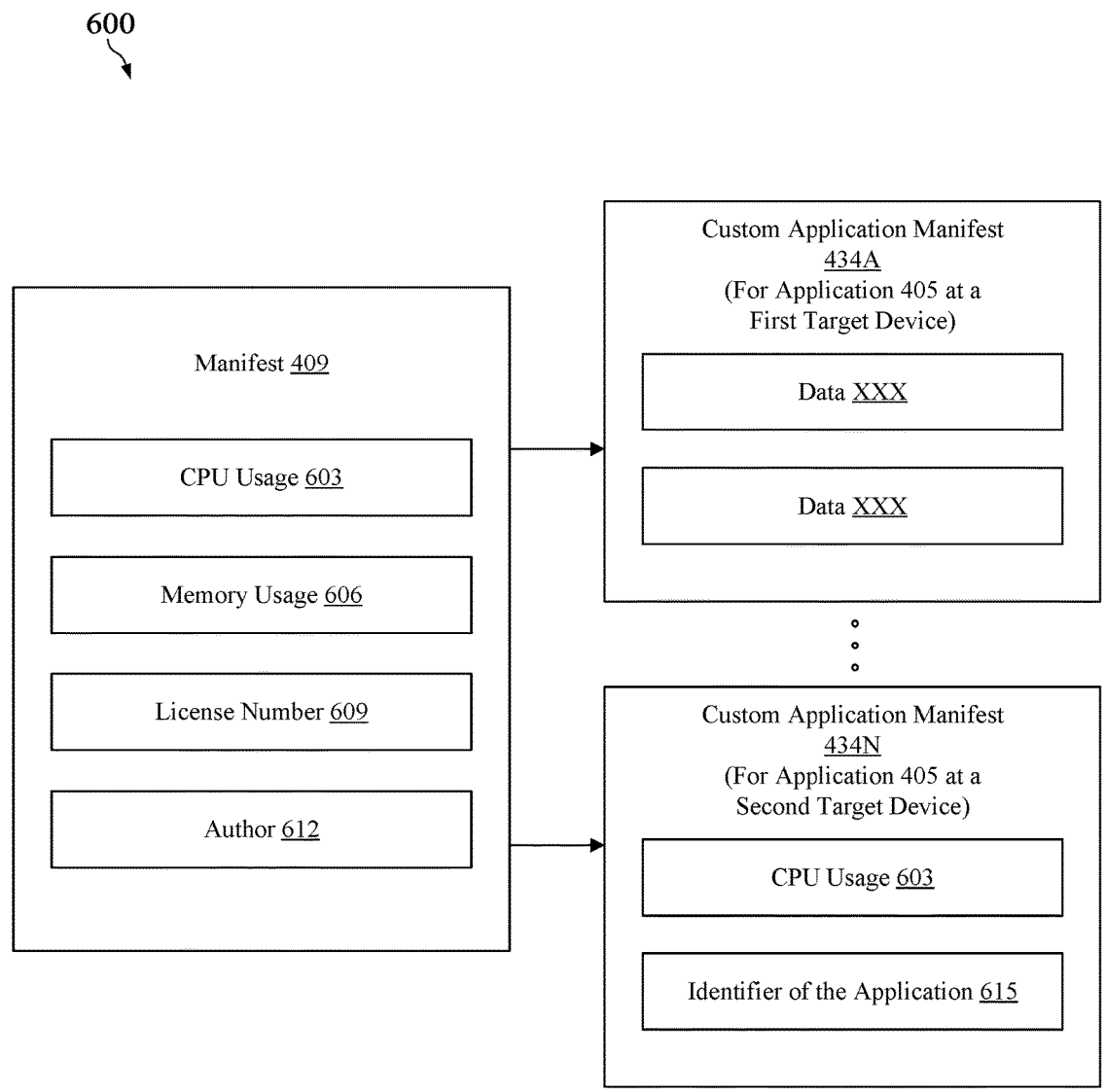
FIG. 6 is a diagram illustrating a process of creating one or more custom application manifests according to various embodiments of the disclosure.

FIG. 6 is a diagram illustrating a process 600 of creating one or more custom application manifests 434A-N according to various embodiments of the disclosure. In an embodiment, the process 600 may be performed by the application packaging module 233, which is executed by the processor 230 of the application packaging device 200. For example, process 600 may be performed by the manifest builder engine 424. While the example process 600 shows the process of generating two custom application manifests 434A and 434N, it should be appreciated that the example process 600 may be used to generate any number of custom application manifests 434A-N for any number of target devices.

As shown in FIG. 6 and described above with reference to FIG. 4, the manifest 409 may be included in an application source 403 corresponding to a particular application 405. The manifest 409 may be a file, such as an Extensible Markup Language (XML) file, that describes and identifies the shared and private data that an application should bind to at run time to a target environment. The manifest 409 may include data that is relevant to the installation and execution of the application and data that is irrelevant to the installation and execution of the application.

For example, the manifest 409 may include a CPU usage 603, a memory usage 606, a license number 609, and an author 612. While the manifest 409 shown in FIG. 6 only includes these four data values, it should be appreciated that the manifest 409 may include any amount of data, and the manifest 409 is not limited by the embodiment shown in FIG. 6.

The CPU usage 603 may include a value that indicates how much CPU processing power is used during the execution of application 405. The memory usage 606 may include a value that indicates how much memory is used during the execution of the application 405. The license number 609 may include a license number of the application 405. The author 612 may include a name of the author of the application 405.

In an embodiment, the manifest builder engine 424 may determine which of the information included in the manifest 409 is relevant to the execution of the application 405 at a particular target device. The manifest builder engine 424 may filter out, or remove, the information in the manifest 409 that is irrelevant to the execution of the application 405 at a particular target device to create the custom application manifests 434A-N.

For example, suppose that the manifest builder engine 424 determines that when the application 405 is executed at a first target device, the irrelevant information in the manifest 409 may be the license number 609 and the author 612. In this way, the manifest builder engine 424 removes the license number 609 and the author 612 from the manifest 409 to create the custom application manifest 434A for application 405 executed at a first target device. The custom application manifest 434A may only include the data that is relevant to the execution of application 405 at the first target device. The first target device may be the edge computing device 300 or any other target device that is configured to install the custom application package 290 including the custom application manifest 434A. In an embodiment, the processor 230 may execute the application packaging module 233 to create the custom application manifest 434A.

In this example, the manifest builder engine 424 may also determine that when the application 405 is executed at a second target device, the irrelevant information in the manifest 409 may be the memory usage 606, the license number 609, and the author 612. In this way, the manifest builder engine 424 removes the memory usage 606, the license number 609, and the author 612 from the manifest 409 to create the custom application manifest 434N for application 405 executed at a second target device.

In some embodiments, the manifest builder engine 424 may add information that is not already present in the manifest 409 to the custom application manifest 434N. For example, suppose that an identifier of the application 615 is not already present in the manifest 409 but is relevant to the execution of application 405 at the second target device. In this case, the manifest builder engine 424 may add the identifier of the application 615 to the custom application manifest 434. The custom application manifest 434A may only include the data that is relevant to the execution of application 405 at the second target device. The second target device may be the edge computing device 300 or any other target device that is configured to install the custom application package 290 including the custom application manifest 434N. In an embodiment, the processor 230 may execute the application packaging module 233 to create the custom application manifest 434N.

Figure 7:
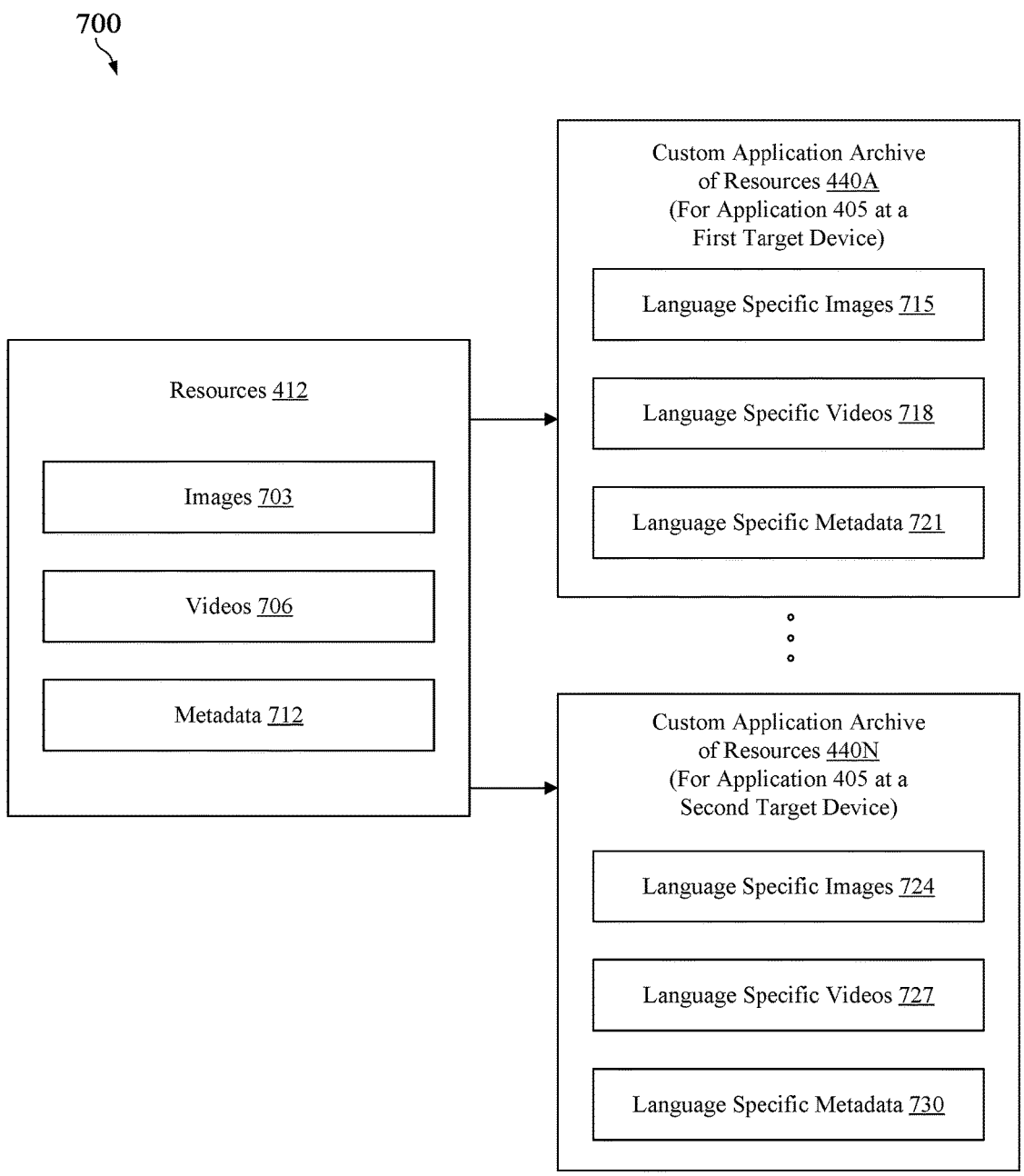
FIG. 7 is a diagram illustrating a process of creating one or more custom application package resources according to various embodiments of the disclosure.

FIG. 7 is a diagram illustrating a process 700 of creating one or more custom application archives of resources 440A-N according to various embodiments of the disclosure. In an embodiment, the process 700 may be performed by the application packaging module 233, which is executed by the processor 230 of the application packaging device 200. For example, process 700 may be performed by the manifest builder engine 424. While the example process 600 shows the process of generating two custom application archives of resources 440A and 440N, it should be appreciated that the example process 600 may be used to generate any number of custom application archives of resources 440A-N for any number of target devices.

As shown in FIG. 7 and described above with reference to FIG. 4, the resources 412 may be included in an application source 403 corresponding to a particular application 405. The resources 412 may include application class files, metadata, text, images, video content, and/or any other data that the application 405 may use during execution of the application 405 at any device.

The resources 412 shown in FIG. 7 include images 703, videos 706, and metadata 712. The images 703 may be images used by application 405. The videos 706 may be videos used by the application 405. The metadata 712 may be metadata used by the application 405. The images 703, videos 706, and metadata 712 have not been reformatted such that the images 703, videos 706, and metadata 712 are compatible to any particular target device, such as the edge computing device 300. While the resources 412 shown in FIG. 7 only include these three resources, it should be appreciated that the resources 412 may include any number of resources or type of resource, and the resources 412 are not limited by the embodiment shown in FIG. 7.

In an embodiment, the resource builder engine 437 is configured to reformat the resources 412 into a format that is compatible with the target device which is receiving and installing the application 405 to create the custom application archive of resources 440A-N. For example, the resource builder engine 437 is configured to reformat the images 703, videos 706, and metadata 712 to create the language specific images 715, language specific videos 718, and language specific metadata 721. The language specific images 715, language specific videos 718, and language specific metadata 721 may be in formats that are compatible with and understood by a first target device. The language specific images 715, language specific videos 718, and language specific metadata 721 may also be used by the application 405 when installing, compiling, building, and/or executing at the first target device. The language specific images 715, language specific videos 718, and language specific metadata 721 may be aggregated and archived into the custom application archive of resources 440A for application 405 at the first target device. The first target device may be the edge computing device 300 or any other target device that is configured to install the custom application package 290 including the custom application archive of resources 440A. In an embodiment, the processor 230 may execute the application packaging module 233 to create the custom application archive of resources 440A.

In this example, the resource builder engine 437 may also be configured to reformat the images 703, videos 706, and metadata 712 to create the language specific images 724, language specific videos 727, and language specific metadata 730 for application 405 executed at a second target device. The language specific images 724, language specific videos 727, and language specific metadata 730 may be formats that are compatible with and understood by a second target device. The language specific images 724, language specific videos 727, and language specific metadata 730 may also be used by the application 405 when installing, compiling, building, and/or executing at the second target device. The language specific images 724, language specific videos 727, and language specific metadata 730 may be aggregated and archived into the custom application archive of resources 440N for application 405 at the second target device. The second target device may be the edge computing device 300 or any other target device that is configured to install the custom application package 290 including the custom application archive of resources 440A. In an embodiment, the processor 230 may execute the application packaging module 233 to create the custom application archive of resources 440N.

Figure 8:
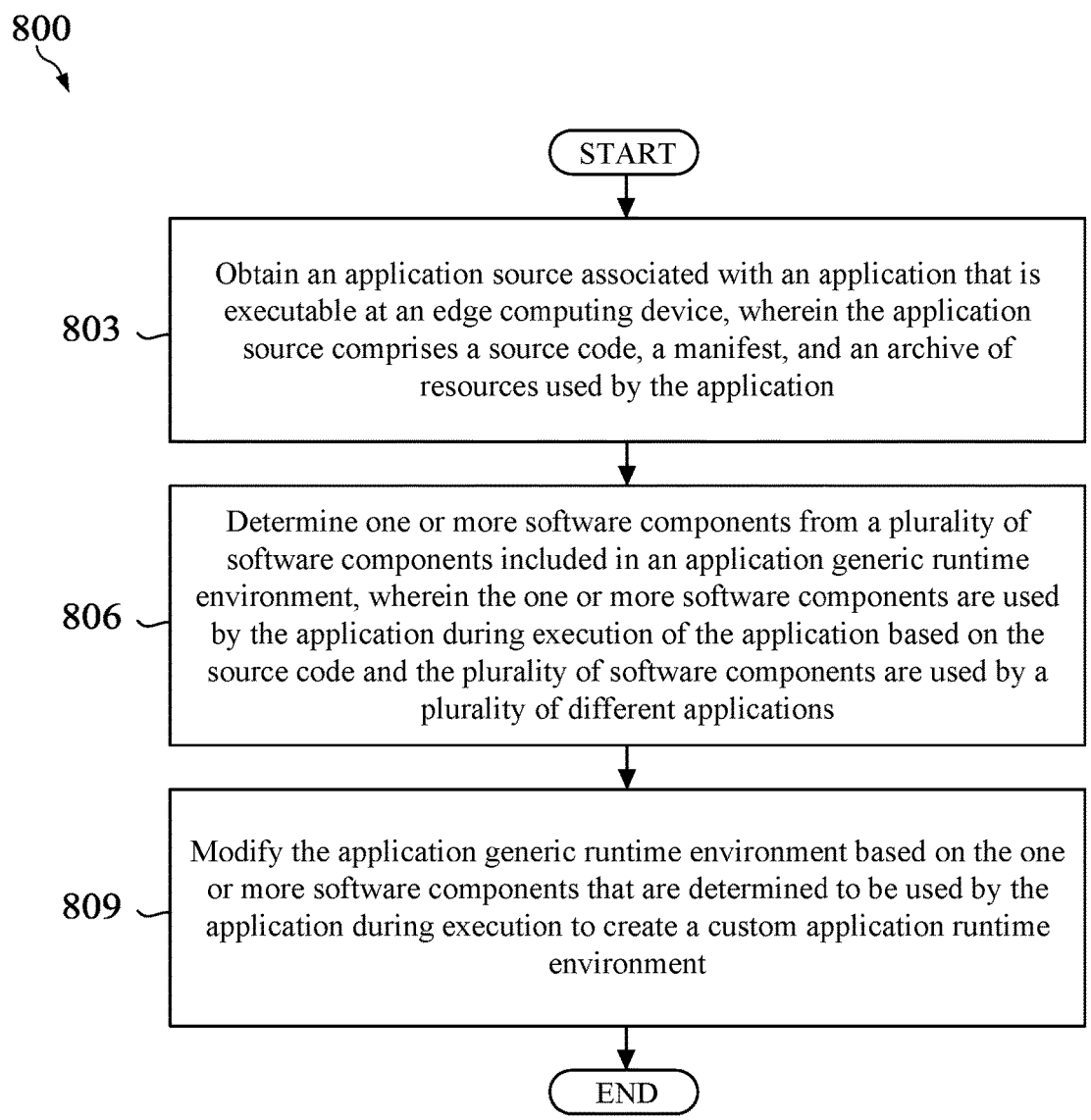
FIG. 8 is a flowchart of a method of application defined application packaging according to various embodiments disclosed herein.

FIG. 8 is a flowchart of a method 800 of application defined application packaging according to various embodiments disclosed herein. The method 800 may be performed by the application packaging module 233, which may be executed by the processor 230 of the application packaging device 200. The method 800 may begin when the application packaging device 200 obtains an application source 403. When the application packaging device 200 is an application developer, the method 800 may begin when the application packaging device 200 generates the application source 403. When the application packaging device 200 is an application vendor, the method 800 may begin when the application packaging device 200 receives the application source 403 from an application developer.

At step 803, an application source 403 associated with an application 405 that is executable at an edge computing device 300 may be obtained. For example, the application packaging module 233 may obtain the application source 403 by either generating the application source 403 or receiving the application source 403 from an application developer. In an embodiment, the application source 403 comprises a source code 406, a manifest 409, and an archive of resources 412 used by the application 405.

At step 806, one or more software components 506, 509, 512, 515, 518, 521, and 525 from the plurality of software components included in an application generic runtime environment 260 that are used by the application 405 during execution of the application 405 may be determined based on the source code 406. For example, the application packaging module 233 may be configured to determine the one or more software components 506, 509, 512, 515, 518, 521, and 525 in an application generic runtime environment 260 that are used by the application 405 during execution of the application 405 based on the source code 406. For example, the composite builder engine 415 may scan the source code 406 to identify an aggregated composite manifest 418, which includes all the software components that the application 405 may use during execution. The dependency builder engine 421 may identify the software libraries that the application 405 may use during execution based on the aggregated composite manifest 418 to generate a dependency manifest 423. The dependency manifest 423 may indicate some of the software components 506, 509, 512, 515, 518, 521, and 525 in an application generic runtime environment 260 that are used by the application 405 during execution of the application 405. The other software components that are used by the application 405 may be retrieved by the artifact builder engine 426 and added to the artifact archive 429. In some embodiments, the application generic runtime environment 260 comprises a plurality of software components that are used by a plurality of different applications.

At step 809, the application generic runtime environment 260 may be modified based on the one or more software components that are determined to be used by the application during execution to create a custom application runtime environment 270. For example, the application packaging module 233 may modify the application generic runtime environment 260 to remove the software components 506, 509, 512, 515, 518, 521, and 525 that are not used by the application 405 during run time to create the custom application runtime environment 270. In this way, the custom application runtime environment 270 only includes the software components 506, 509, 512, 515, 518, 521, and 525 that are used by the application 405 at run time.

In an embodiment, the disclosure includes an apparatus comprising a means for obtaining an application source associated with an application that is executable at an edge computing device, wherein the application source comprises a source code, a manifest, and an archive of resources used by the application, a means for determining one or more software components in an application generic runtime environment that are used by the application during execution of the application based on the source code, wherein the application generic runtime environment comprises a plurality of software components that are used by a plurality of different applications, and a means for modifying the application generic runtime environment based on the one or more software components that are determined to be used by the application during execution to create a custom application runtime environment.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by an application packaging device coupled to an edge computing device, the method comprising:
   obtaining, by a processor of the application packaging device, an application source associated with an application that is executable at the edge computing device, wherein the application source comprises a source code, a manifest, and an archive of resources used by the application;
   determining, by the processor of the application packaging device, a software component from a plurality of software components included in an application generic runtime environment and used by the application during execution of the application at the edge computing device based on the source code, wherein the plurality of software components included in the application generic runtime environment are used by a plurality of different applications; and
   filtering, by the processor of the application packaging device, the application generic runtime environment to exclude unused software components from the application generic runtime environment and include software component that is used by the application during execution at the edge computing device to create a custom application runtime environment.

2. The method of claim 1, wherein the edge computing device is deployed between a client and a packet network.

3. The method of claim 1, wherein the software component comprises at least one of a class, object, system variable, environmental variable, software library, package, application programming interface (API), algorithm, or data structure that provide services and support to a plurality of processes that are involved in execution of the application.

4. The method of claim 1, wherein the manifest comprises at least one of a central processing unit (CPU) usage that occurs when executing the application, a memory usage that occurs when executing the application, a disk space required to execute the application, a license association with the application, a company that owns the application, or an author of the application.

5. The method of claim 1, wherein the application generic runtime environment is one or more files comprising at least one of a library, system variables, or environmental variables that provide services and support to a plurality of processes that are involved in execution of a plurality of different applications.

6. The method of claim 1, wherein filtering the application generic runtime environment comprises removing, by the processor of the application packaging device, an unused software component of the plurality of software components that is not used by the application during execution of the application at the edge computing device to create the custom application runtime environment.

7. The method of claim 1, wherein filtering the application generic runtime environment comprises:

receiving, by the processor of the application packaging device, an external software component that is used by the application during execution of the application and is not included in the application generic runtime environment; and adding, by the processor of the application packaging device, the external software component to the custom application runtime environment.

8. An apparatus implemented as an application packaging device, comprising:

a memory storage comprising instructions; and one or more processors in communication with the memory storage, wherein the one or more processors execute the instructions to:

obtain an application source associated with an application that is executable at an edge computing device, wherein the application source comprises a source code, a manifest, and an archive of resources used by the application;

determine a software component from a plurality of software components included in an application generic runtime environment and used by the application during execution of the application at the edge computing device based on the source code, wherein the plurality of software components included in the application generic runtime environment are used by a plurality of different applications; and filter the application generic runtime environment to exclude unused software components from the application generic runtime environment and include the software component that is used by the application during execution at the edge computing device to create a custom application runtime environment.

9. The apparatus of claim 8, wherein the one or more processors execute the instructions to:

modify the manifest to include only information that is relevant to the edge computing device to create a custom application manifest file; and reformat each resource in the archive of resources such that each resource is compatible with the edge computing device and to create a custom application archive of resources.

10. The apparatus of claim 9, wherein the one or more processors execute the instructions to:

compress the custom application runtime environment, the custom application manifest file, and the custom application archive of resources; and package the custom application runtime environment, the custom application manifest file, and the custom application archive of resources into a custom application package.

11. The apparatus of claim 10, further comprising a transmitter coupled to the one or more processors and configured to transmit the custom application package to the edge computing device.

12. The apparatus of claim 8, wherein the apparatus is at least one of an application developer or an application vendor.

13. The apparatus of claim 8, wherein the one or more processors are further configured to remove another software component of the plurality of software components that is not used by the application during execution of the application to create the custom application runtime environment.

14. The apparatus of claim 8, wherein the one or more processors are further configured to:

receive an external software component that is used by the application during execution of the application and is not included in the application generic runtime environment; and add the external software component to the custom application runtime environment.

15. A non-transitory medium configured to store a computer program product comprising computer executable instructions that when executed by a processor cause the processor to:

obtain an application source associated with an application that is executable at an edge computing device, wherein the application source comprises a source code, a manifest, and an archive of resources used by the application;

determine a software component from a plurality of software components included in an application generic runtime environment and used by the application during execution of the application at the edge computing device based on the source code, wherein the plurality of software components included in the application generic runtime environment are used by a plurality of different applications; and filter the application generic runtime environment to exclude unused software components from the application generic runtime environment and include the software component used by the application during execution at the edge computing device to create a custom application runtime environment.

16. The non-transitory medium of claim 15, wherein the computer executable instructions that when executed by the processor further cause the processor to:

modify the manifest to include only information that is relevant to the edge computing device to create a custom application manifest file; and reformat each resource in the archive of resources such that each resource is compatible with the edge computing device and to create a custom application archive of resources.

17. The non-transitory medium of claim 16, wherein the computer executable instructions that when executed by the processor further cause the processor to:

package the custom application runtime environment, the custom application manifest file, and the custom application archive of resources into a custom application package; and transmit the custom application package to the edge computing device.

18. The non-transitory medium of claim 15, wherein the software component comprises at least one of a class, object, system variable, environmental variable, software library, package, application programming interface (API), algorithm, or data structure that provide services and support to a plurality of processes that are involved in execution of the application.

19. The non-transitory medium of claim 15, wherein the custom application runtime environment only comprises the software components that are used by the application during execution of the application.

20. The non-transitory medium of claim 15, wherein the runtime environment is a file comprising at least one of a library, system variables, or environmental variables that provide services and support to a plurality of processes that are involved in execution of a plurality of different applications.

* * * * *